United States Patent
Kato

(10) Patent No.: US 9,001,065 B2
(45) Date of Patent: Apr. 7, 2015

(54) TOUCH SCREEN DEVICE

(71) Applicant: Alpine Electronics, Inc., Tokyo (JP)

(72) Inventor: Kazunari Kato, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 321 days.

(21) Appl. No.: 13/728,792

(22) Filed: Dec. 27, 2012

(65) Prior Publication Data

US 2013/0241849 A1  Sep. 19, 2013

(30) Foreign Application Priority Data

Mar. 15, 2012  (JP) .................................. 2012-059101

(51) Int. Cl.
*G06F 3/041* (2006.01)
*G06F 3/01* (2006.01)

(52) U.S. Cl.
CPC .............. G06F 3/0414 (2013.01); G06F 3/016 (2013.01)

(58) Field of Classification Search
USPC ......................................................... 345/173
See application file for complete search history.

(56) References Cited

U.S. PATENT DOCUMENTS

| | | | | |
|---|---|---|---|---|
| 3,618,070 A | * | 11/1971 | Kagan ............................ | 340/7.6 |
| 4,871,992 A | * | 10/1989 | Petersen .................... | 340/407.1 |
| 5,626,223 A | * | 5/1997 | Lee ................................ | 200/529 |
| 6,693,248 B1 | * | 2/2004 | Schultz ...................... | 200/11 TC |
| 6,705,868 B1 | * | 3/2004 | Schleppenbach et al. ..... | 434/114 |
| 2004/0091101 A1 | * | 5/2004 | Park et al. ................. | 379/428.01 |
| 2004/0108995 A1 | * | 6/2004 | Hoshino et al. ............... | 345/173 |
| 2007/0289856 A1 | * | 12/2007 | Horton .......................... | 200/327 |
| 2010/0148945 A1 | * | 6/2010 | Yun et al. .................. | 340/407.2 |
| 2012/0162939 A1 | * | 6/2012 | Idzik et al. ..................... | 361/752 |

FOREIGN PATENT DOCUMENTS

JP   2005-275632   10/2005

\* cited by examiner

*Primary Examiner* — William Boddie
*Assistant Examiner* — Andrew Schnirel
(74) *Attorney, Agent, or Firm* — Brinks Gilson & Lione

(57) ABSTRACT

A touch screen device includes a motor attached to a movable chassis to support the touch panel, a rotor fixed to the motor shaft, a driven rotor meshing with the rotor, a cam mechanism that converts the rotational driving force of the motor into a driving force in the thrust direction and transmits the driving force to the movable chassis, and a leaf spring elastically urging the touch panel moved by the cam mechanism toward the original position. The cam mechanism includes two wave cam portions that each have a cam surface having a series of wave-like recesses and protrusions arranged along a circumference and, and cam engaging portions that are provided at the axial ends of the rotors and that are in sliding contact with the cam surfaces.

17 Claims, 10 Drawing Sheets

TOUCH SCREEN DEVICE

PRIORITY CLAIM

This application claims the benefit of Japanese Patent Application No. 2012-059101, filed on Mar. 15, 2012, and which is incorporated by reference herein in its entirety.

BACKGROUND

1. Field of the Invention

The present invention relates to a touch screen device in which a fingertip of the user, or the like, is pressed against the surface of a touch panel, and an input operation is thereby performed, and more specifically, it relates to a touch screen device in which feedback using sense of touch to the user can be performed by vibrating the touch panel at the time of input operation.

2. Description of the Related Art

When a touch screen device having a feedback mechanism that vibrates a touch panel at the time of input operation detects that a fingertip or the like of the user is pressed against any place or a predetermined area of the surface (input operation surface) of the touch panel, an actuator that is a vibration generation source is activated and minutely vibrates the touch panel. For example, when a fingertip or the like of the user is pressed against the input operation surface of the touch panel, the device detects this and vibrates the touch panel. The vibration is transmitted to the fingertip or the like, and the user can sense that input operation is being performed without fail. When it is detected that a fingertip or the like of the user is pressed against a particular area of the input operation surface (an area in the image on the display panel where selection items are displayed), the touch panel is vibrated in a vibration pattern corresponding to the particular area. This makes it easy to prevent erroneous operation.

In general, a piezoelectric element, a motor with an eccentric weight, or an electromagnetic actuator is used as a vibration generation source in this type of touch screen device (see, for example, Japanese Unexamined Patent Application Publication No. 2005-275632). When the vibration generation source is a piezoelectric element, the touch panel can be directly vibrated. A motor with an eccentric weight is often used as a vibration generation source in cell-phones or the like. The touch panel is vibrated by rotating the eccentric weight with a small cylindrical motor. When an electromagnetic actuator is used as a vibration generation source, the touch panel is vibrated by vibrating a movable coil or the like in a magnetic circuit.

However, when a piezoelectric element is used as a vibration generation source of a touch panel, the cost of the touch screen device increases because the piezoelectric element is expensive and a booster circuit or the like needs to be provided. In addition, since the driving force generated by a piezoelectric element is small, using a piezoelectric element as a vibration generation source in order to vibrate a touch panel with a high acceleration (for example, about 5 G) is inefficient and is not practical.

When a motor with an eccentric weight is used as a vibration generation source of a touch panel, the cost is reduced, but the amplitude in the desired direction of vibration is not stable because the vibration is generated by the rotation of the eccentric weight. The user easily recognizes the vibration of the touch panel in the thickness direction thereof (direction perpendicular to the input operation surface), and it is effective to vibrate the touch panel in this direction. However, when a motor with an eccentric weight is used, the vibrating direction of the touch panel varies, and therefore it is difficult to efficiently vibrate a touch panel having a somewhat large screen. If a large and powerful cylindrical motor is used, the touch panel can be vibrated with a high acceleration. However, in this case, the thickness of the touch screen device increases undesirably.

When an electromagnetic actuator is used as a vibration generation source of a touch panel, the thickness of the touch screen device increases owing to the magnetic circuit. In this case, a very large magnetic circuit needs to be incorporated in order to vibrate the touch panel with a high acceleration. Therefore, the thickness of the touch screen device is significantly increased.

SUMMARY

Embodiments of the present invention have been made in view of the above problems of conventional arts. It is an object of the present invention to provide a touch screen device that is capable of vibrating a touch panel with a high acceleration, and in which an increase in cost and thickness can be easily avoided.

To attain the above object, in an aspect of the present invention, a touch screen device includes a display panel, a touch panel placed in front of the display panel, a movable chassis holding the touch panel, a vibration imparting mechanism capable of vibrating the touch panel in the thickness direction via the movable chassis, and a stationary chassis supporting the movable chassis in a vibratable state. The vibration imparting mechanism includes a motor attached to one of the movable chassis and the stationary chassis, the axis of a motor shaft extending in the thickness direction of the touch panel, a cam mechanism that converts the rotational driving force of the motor into a driving force in the thickness direction of the touch panel and transmits the driving force to the movable chassis, and an elastically urging portion elastically urging the movable chassis moved by the cam mechanism toward the original position. The cam mechanism includes a wave cam portion having a cam surface having a series of wavelike recesses and protrusions arranged along a circumference around the axis of the motor, and a cam engaging portion that is in sliding contact with the cam surface and is rotatable relative to the wave cam portion, one of the wave cam portion and the can engaging portion is integrated with the motor shaft, and the other is integrated with the movable chassis or the stationary chassis to which the motor is not attached.

According to the above configuration, the cam engaging portion slides relative to the cam surface of the wave cam portion with the rotation of the motor shaft, therefore the rotational driving force of the motor is converted into a driving force in the thrust direction, and the touch panel can be vibrated in the thickness direction via the movable chassis. At that time, a vibration pattern or vibration acceleration corresponding to the shape of the cam surface can be imparted to the touch panel. After the cam mechanism moves the touch panel in the thickness direction, the elastically urging portion elastically urges the touch panel (movable chassis) toward the original position. Therefore, it is easy to vibrate the touch panel in the thickness direction with a high acceleration smoothly. In addition, since a thin and inexpensive motor can be used, an increase in cost and thickness of the whole device can be easily avoided. Such a touch screen device can reliably feedback input operation as vibration of the touch panel to the sense of touch of the user by activating the motor and vibrating the touch panel when the touch panel detects that a fingertip or the like of the user is pressed against the input operation surface.

It is preferable that, in the above touch screen device, the vibration imparting mechanism have a rotor having a weight distribution that is point-symmetrical with respect to the axis of the motor shaft, and the rotor be fixed to the motor shaft because vibration with a high acceleration can be imparted to the touch panel utilizing the inertial force of the rotor rotationally driven by the motor.

If, in this case, one of the cam engaging portion and the wave cam portion is provided at the axial end of the rotor, the number of parts of the touch screen device can be reduced and the ease of assembly is improved.

In the above touch screen device, the motor may be attached to the stationary chassis. However, if the motor is attached to the movable chassis, it is easy to stably vibrate the touch panel in the thickness direction with the rotational driving force of the motor.

It is also preferable that the cam engaging portion have a sliding cam surface having the same shape as the cam surface of the wave cam portion, and the sliding cam surface can be in sliding contact with the cam surface over the entire circumference. According to this configuration, the cam surface of the cam engaging portion and the cam surface of the wave cam portion are almost in contact with each other over the entire circumference when the peaks of one of them are fitted in the valleys of the other, and one of the cam engaging portion and the wave cam portion is pushed up relative to the other in the thickness direction of the touch panel when the peaks of one of them are located on the peaks of the other. For this reason, the touch panel can be smoothly vibrated in the thickness direction with the rotation of the motor shaft by a cam mechanism having a simple structure, and the operation reliability is improved.

It is further preferable that, in the above touch screen device, the vibration imparting mechanism have a driven rotor rotatably supported by the movable chassis or the stationary chassis to which the motor is attached, the driven rotor have a weight distribution that is point-symmetrical with respect to its rotation axis, gear portions provided on the peripheries of the rotor and the driven rotor be meshed with each other, one of an axial end of the driven rotor and a member in sliding contact with the axial end be provided with a wave cam portion equivalent to the wave cam portion, and the other be provided with a cam engaging portion equivalent to the cam engaging portion. According to this configuration, cam mechanisms that convert the rotational driving force of the motor into a driving force in the thrust direction can be disposed in a well-balanced manner at a plurality of places. Therefore, the movable chassis can be easily vibrated in the thickness direction of the touch panel with a high acceleration utilizing the inertial force of the rotor and the driven rotor. Therefore, even when the touch panel is relatively large, required vibration acceleration can be easily transmitted to a fingertip or the like of the user. When the rotor is rotationally driven by the motor, the driven rotor is rotationally driven in the opposite direction. Therefore, if unwanted force that drives the touch panel in the in-plane direction is generated by the rotation of the rotor, this unwanted force can be cancelled out with the rotation of the driven rotor.

If, in the above touch screen device, the elastically urging portion includes a plurality of leaf springs attached to the stationary chassis and supporting the movable chassis, the structure of the whole device is prevented from being complicated and the component cost can be easily reduced.

If, in the above touch screen device, the display panel is fixed to the stationary chassis, the display panel does not vibrate and is maintained in a fixed state when the touch panel is vibrated by the driving force of the motor. Therefore, the total weight of the vibrating body is reduced, the touch panel is easily vibrated, and the display panel that is an LCD or the like is safe from image disruption caused by vibration. However, when the amplitude of vibration imparted to the touch panel is not very large, both the touch panel and the display panel may be held by the movable chassis, and the display panel may be vibrated in the thickness direction together with the touch panel by the driving force of the motor.

Therefore, according to the present invention, a touch screen device having a feedback mechanism that can easily impart desired vibration to a touch panel and cause the user to sense it even when the screen of the touch panel is relatively large can be provided at low cost.

DETAILED DESCRIPTION

Figure 1:
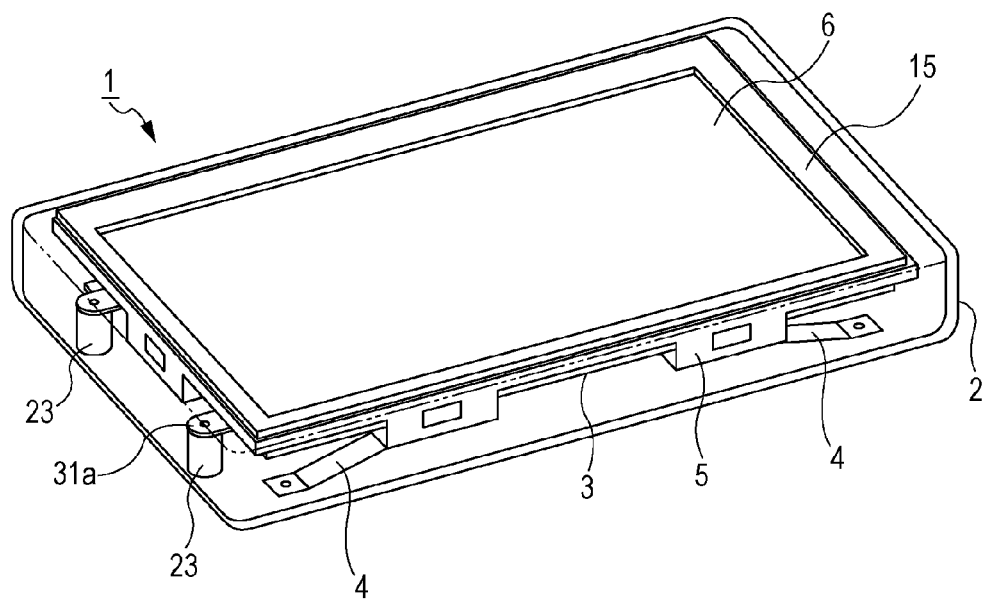
FIG. 1 is a partially transparent external view of a touch screen device according to an embodiment of the present invention.

An embodiment of the present invention will be described with reference to the drawings. As shown in FIG. 1 to FIG. 6, a touch screen device 1 according to this embodiment mainly includes a stationary chassis 2 that doubles as a case, an LCD (liquid crystal display) unit 3 that is held by four attachment bosses 23 vertically arranged on the inner bottom surface of the stationary chassis 2, a movable chassis 5 that is elastically supported by four leaf springs 4 attached to the inner bottom surface of the stationary chassis 2, a touch panel 6 that is held by the movable chassis 5, and a motor 7, a rotor 8, and a driven rotor 9 that are arranged on the underside of the movable chassis 5.

In the touch screen device 1, images displayed on a display panel 30 that is a display device of the LCD unit 3 are viewed by the user through the transparent touch panel 6 placed in front of the display panel 30. When the user presses their fingertip or the like against the surface (input operation surface 6a) of the touch panel 6, the touch panel 6 detects the coordinate position of the fingertip or the like. On the basis of the detection result of the touch panel 6, the operation of the LCD unit 3 and other units is controlled. In the touch screen device 1, when the fingertip or the like of the user is pressed against the input operation surface 6a, the motor 7 is activated and the touch panel 6 vibrates minutely in the thickness direction, as will hereinafter be described in detail.

Figure 4:
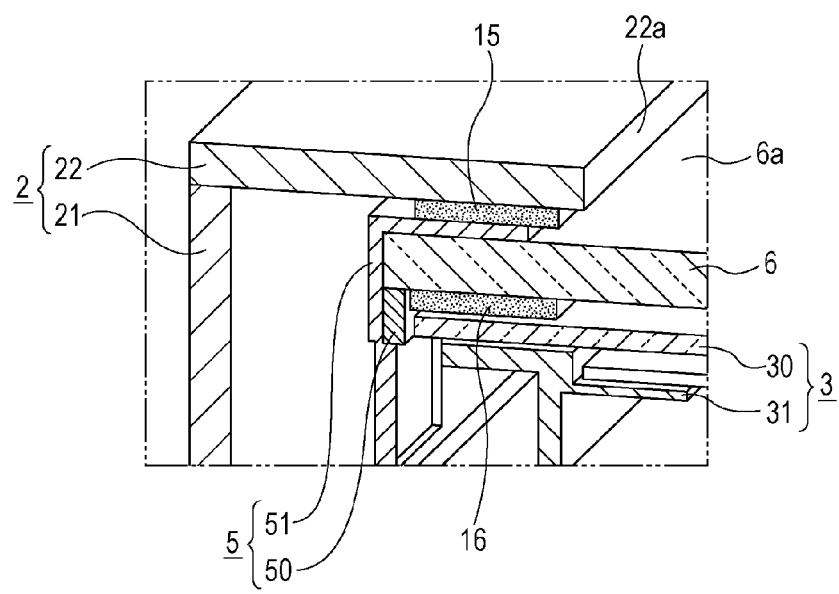
FIG. 4 is a main part sectional view showing the structure of the periphery of the touch screen device.
Figure 11:
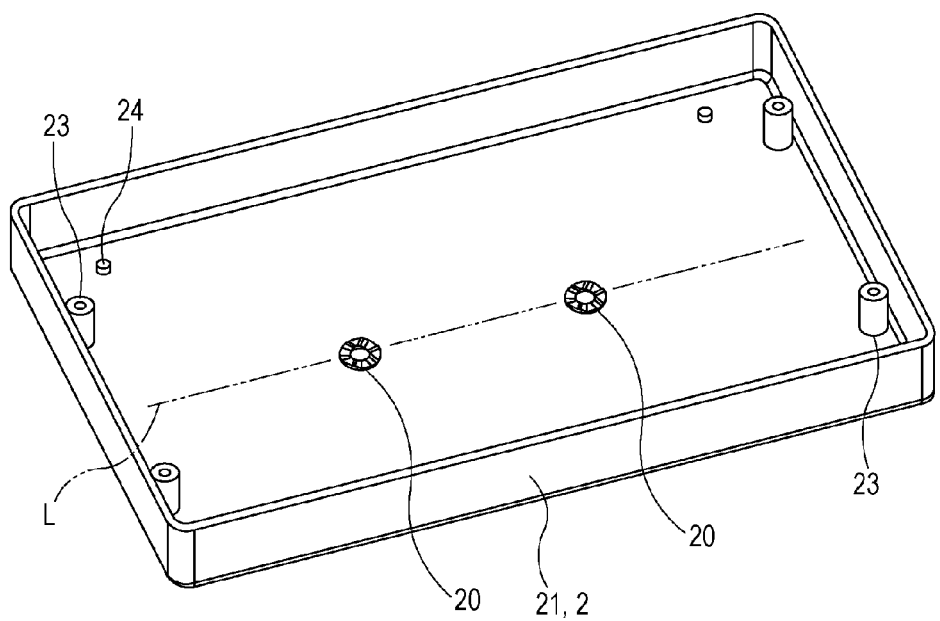
FIG. 11 is a perspective view showing a stationary chassis provided in the touch screen device with a front frame portion thereof omitted.

The stationary chassis 2 includes a bottomed box-like housing stationary portion 21 (see FIG. 11) that has a front opening, and a rectangular frame-like front frame portion 22 that is fixed to the front end of the housing stationary portion 21. The input operation surface 6a of the touch panel 6 is exposed in an opening 22a formed in the front frame portion 22. An attachment boss 23 and a protrusion for caulking 24 are protruded in the vicinity of each of the four corners of the inner bottom surface of the housing stationary portion 21. The attachment bosses 23 are for fixing and holding the LCD unit 3 with screws or the like. The protrusions for caulking 24 are for fixing one end of each leaf spring 4 by thermal caulking or the like. The front frame portion 22 is placed in front of the periphery of the touch panel 6 with a frame-like part of an upper bracket 51 of the movable chassis 5 therebetween. As shown in FIG. 4, a rectangular frame-like cushion member 15 is interposed between the front frame portion 22 and the upper bracket 51. The cushion member 15 prevents penetration of dust or the like into the device, and allows the touch panel 6 to vibrate in the thickness direction.

Figure 13:
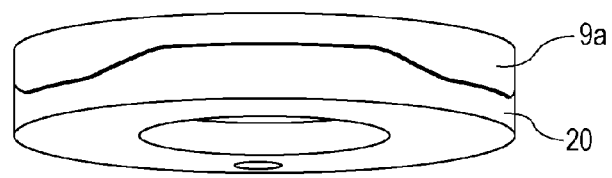
FIG. 13 is an explanatory diagram showing the main part of FIG. 12.
Figure 15:
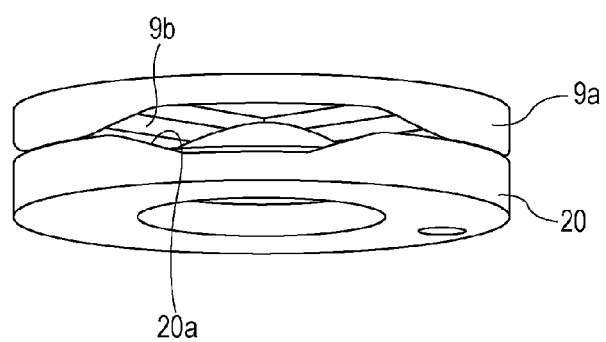
FIG. 15 is an explanatory diagram showing the main part of FIG. 14.

Two wave cam portions 20 each having a cam surface 20a are protruded from the inner bottom surface of the housing stationary portion 21 of the stationary chassis 2. The two wave cam portions 20 are arranged at a predetermined interval on a bisector L along the longitudinal direction of the inner bottom surface. The two wave cam portions 20 have the same shape, and there is no difference between the two wave cam portions 20 in the positions of the recesses and protrusions of the cam surface 20a relative to the bisector L. The two wave cam portions 20 are at substantially the same distance from the longitudinally central part of the inner bottom surface of the housing stationary portion 21. As shown in FIG. 13 and FIG. 15, the cam surface 20a of each wave cam portion 20 has such a shape that a series of wavelike recesses and protrusions (valleys and peaks) are arranged in the circumferential direction, and a total of three peaks are formed at equal angular intervals of 120 degrees. A cam engaging portion 8a provided at the axial end of the rotor 8 is slidably pressed against the left-hand wave cam portion 20 in FIG. 2, and a cam engaging portion 9a provided at the axial end of the driven rotor 9 is slidably pressed against the right-hand wave cam portion 20 in FIG. 2.

Figure 5:
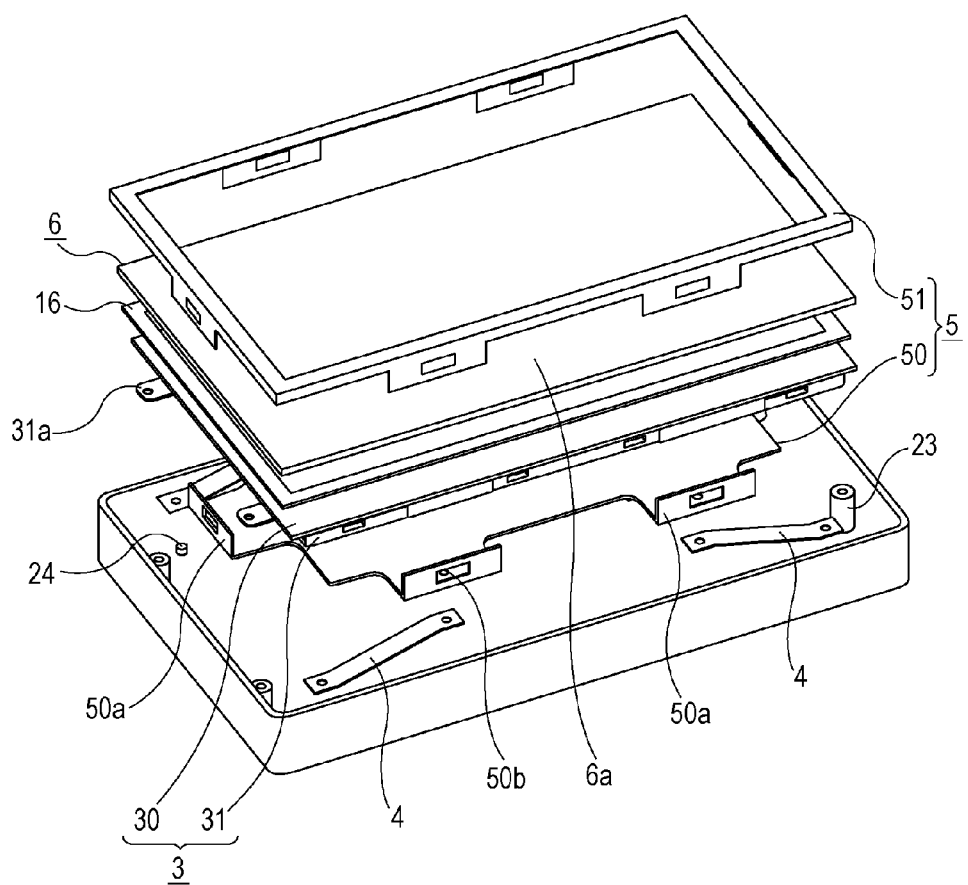
FIG. 5 is an exploded perspective view showing main components of the touch screen device.
Figure 6:
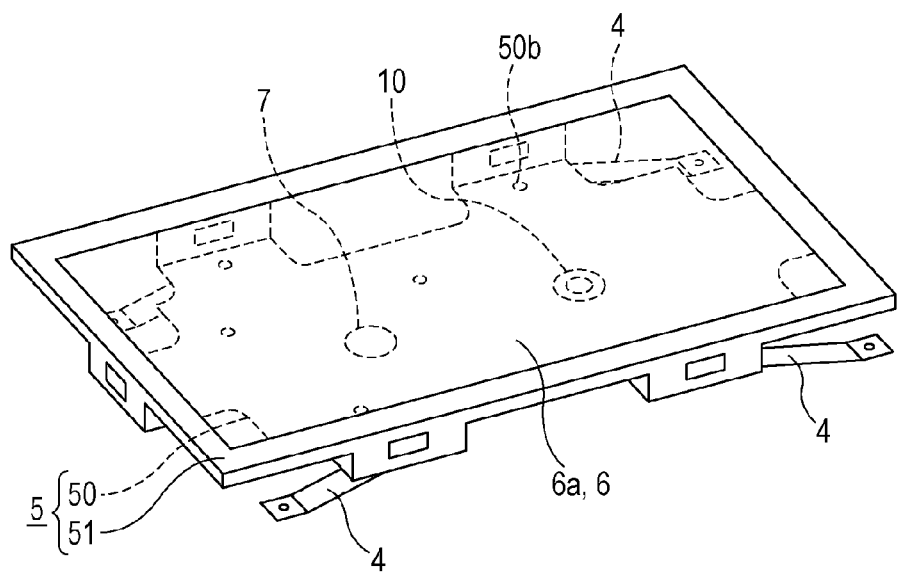
FIG. 6 is a perspective view showing a touch panel and a movable chassis provided in the touch screen device.

The display panel 30 of the LCD unit 3 is held by a bracket 31. Four tongues 31a (see FIG. 5) protruding laterally from the bracket 31 are mounted on corresponding attachment bosses 23 and are fixed with screws or the like, and the LCD unit 3 is thereby held fixedly in a positioned state in the stationary chassis 2. As shown in FIG. 4 and FIG. 5, the touch panel 6 is disposed in front of the display panel 30, and a rectangular frame-like cushion member 16 is interposed between the peripheries of the display panel 30 and the touch panel 6. The cushion member 16 prevents penetration of dust or the like into the gap between the display panel 30 and the touch panel 6, and allows the touch panel 6 to vibrate in the thickness direction.

Figure 2:
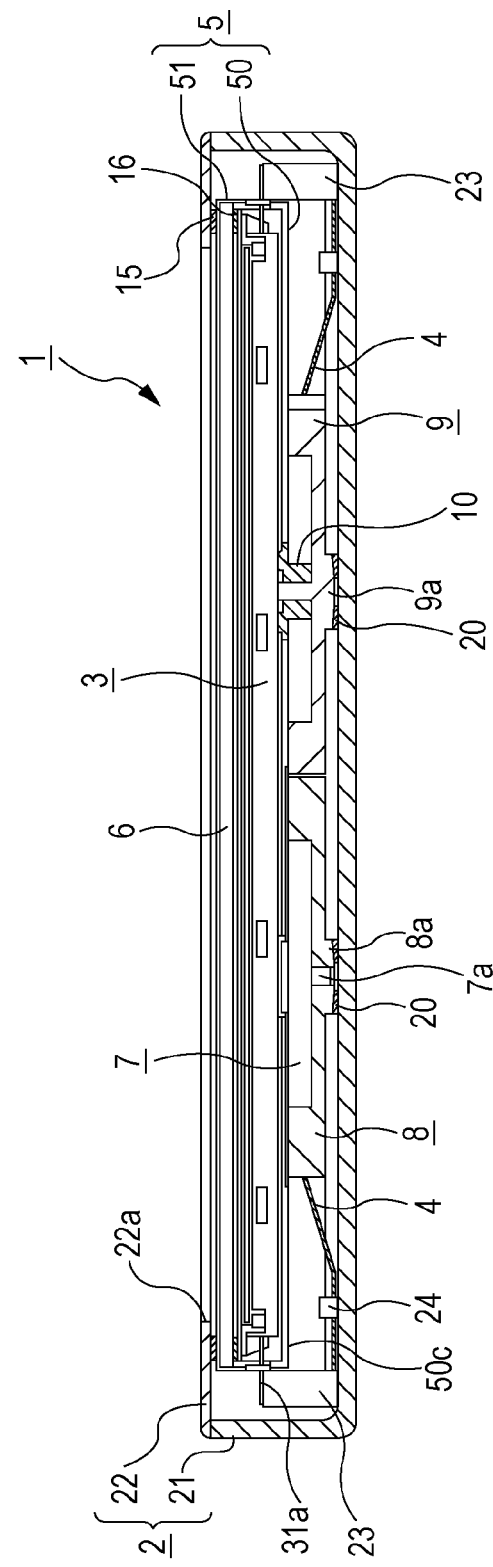
FIG. 2 is a sectional view of the touch screen device.
Figure 3:
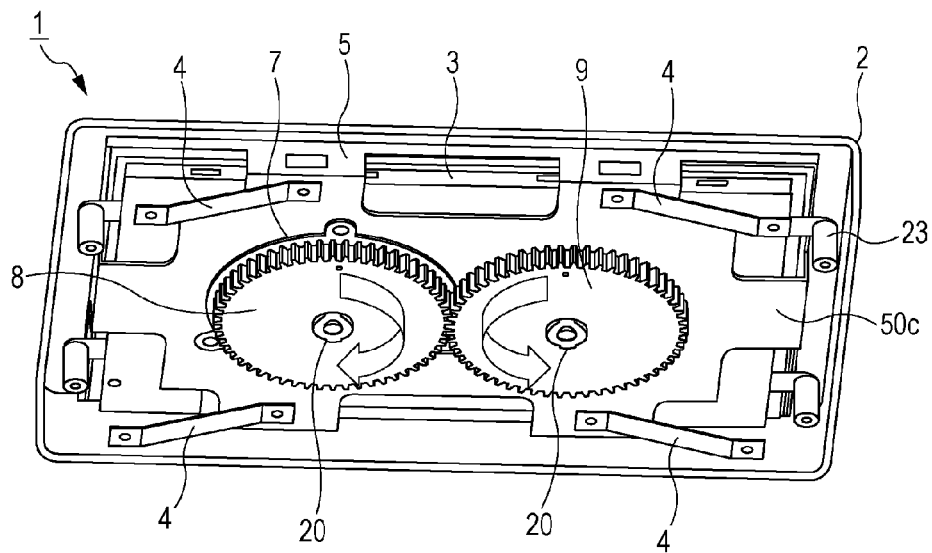
FIG. 3 is a transparent perspective view of the internal structure of the touch screen device from the underside.
Figure 7:
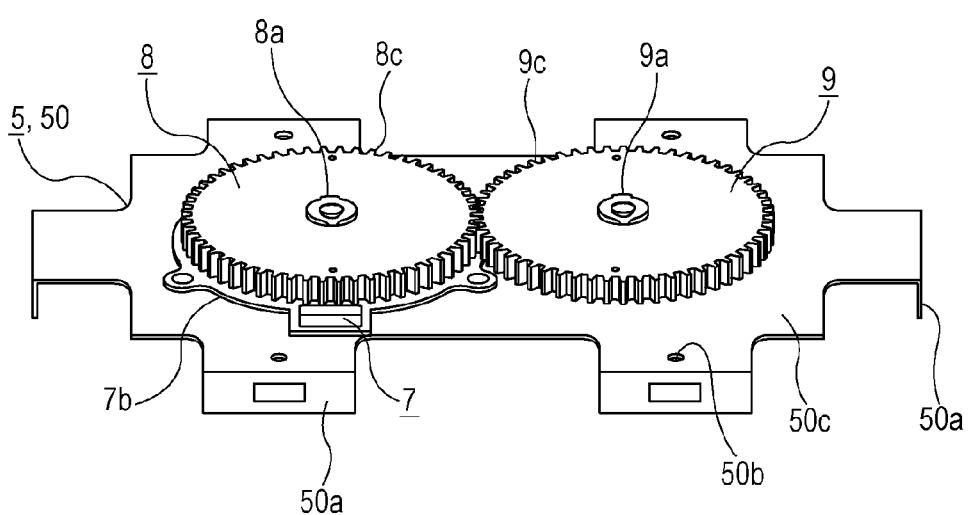
FIG. 7 is a perspective view showing a drive system provided in the movable chassis.
Figure 9:
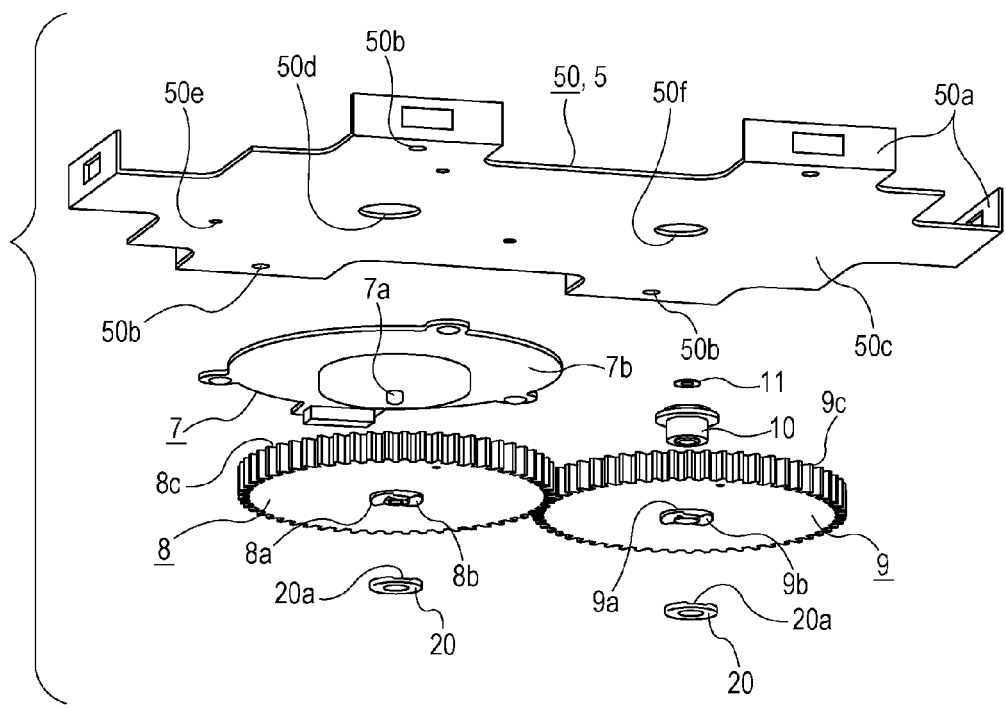
FIG. 9 is an exploded perspective view showing the drive system together with cam mechanisms.
Figure 10:
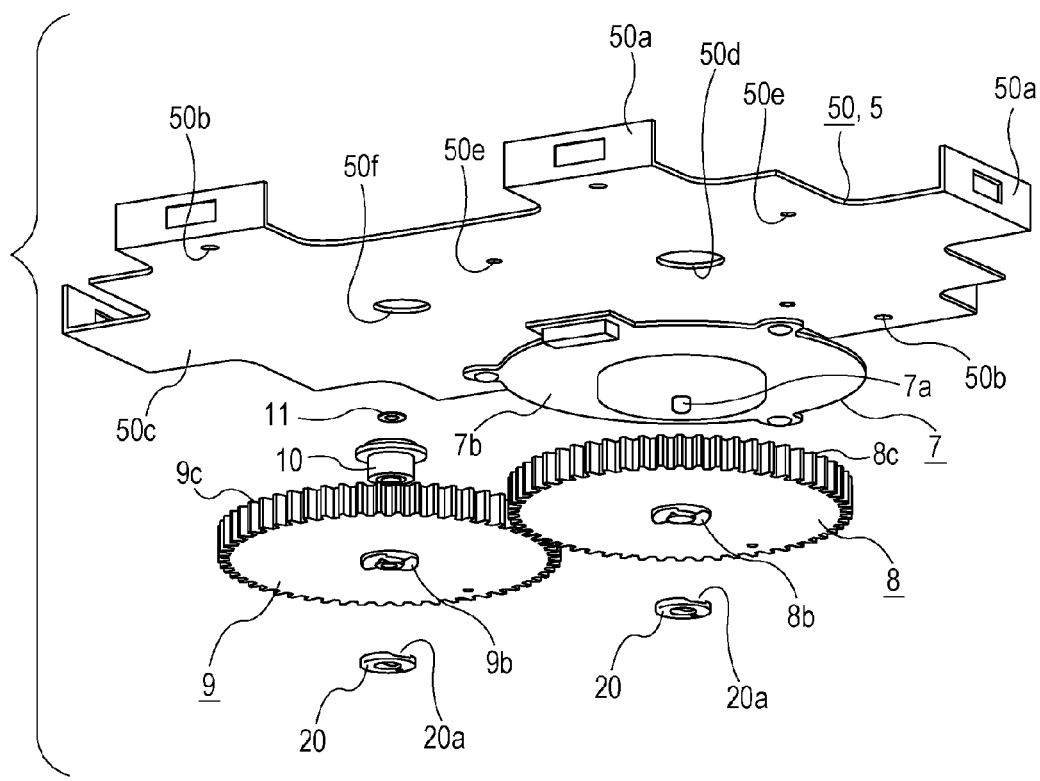
FIG. 10 is an exploded perspective view from another angle corresponding to FIG. 9.

The movable chassis 5 includes a lower bracket 50 and an upper bracket 51, and these brackets 50 and 51 are integrated using snap connection or the like. The movable chassis 5 holds the periphery of the touch panel 6 with a plurality of standing pieces 50a standing from the periphery of the lower bracket 50 and the frame-like part of the upper bracket 51 extending so as to surround the opening 22a of the front frame portion 22, and the touch panel 6 is thereby fixed to the movable chassis 5. Four spring attachment holes 50b (see FIG. 7) are provided on the outer edge of a bottom plate portion 50c of the lower bracket 50. Each of the four leaf springs 4 is fixed to the corresponding one of the spring attachment holes 50b at one end and to the corresponding one of the protrusions for caulking 24 of the stationary chassis 2 at the other end. As shown in FIG. 2 and FIG. 3, the underside of the movable chassis 5 is elastically supported by the inner bottom surface of the stationary chassis 2 via the four leaf springs 4. Each leaf spring 4 elastically urges the movable chassis 5 toward the inner bottom surface of the stationary chassis 2. After the touch panel 6 is pushed up away from the inner bottom surface of the stationary chassis 2 during vibration, the leaf springs 4 elastically urge the touch panel 6 toward the original position, and the touch panel 6 quickly starts moving toward the inner bottom surface of the stationary chassis 2. Thus, smooth vibration can be performed. As shown in FIG. 9 and FIG. 10, attachment holes 50d and 50e for fixing a stator portion 7b of the motor 7 and an attachment hole 50f for fixing a bearing portion 10 rotatably supporting the driven rotor 9 are provided in the bottom plate portion 50c of the lower bracket 50.

The touch panel 6 is a known coordinate input device capable of detecting the coordinate position (x-coordinate and y-coordinate) of a fingertip or the like of the user pressed against the surface (input operation surface 6a) of the touch panel 6. A resistance film method, capacitance method, or the like can be selected as a detecting method. The touch panel 6 is held parallel to the bottom plate portion 50c of the lower bracket 50 and the display panel 30.

Figure 8:
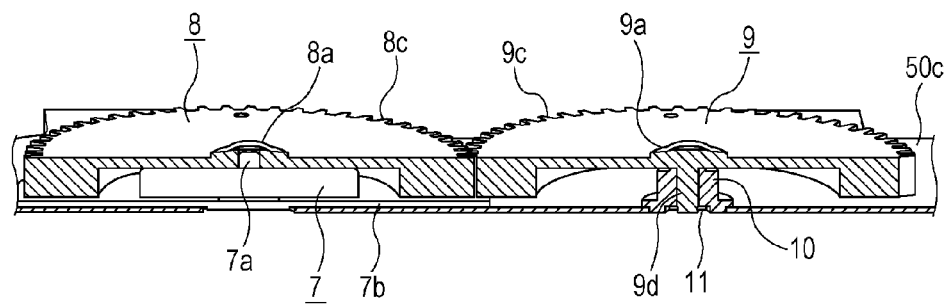
FIG. 8 is a sectional view of the drive system shown in FIG. 7.

The motor 7 is a thin brushless motor in which a motor shaft 7a is protruded from the center of a flattened stator portion 7b. The motor 7 is attached to the movable chassis 5 by fixing the stator portion 7b to the attachment holes 50d and 50e in the bottom plate portion 50c of the lower bracket 50. The motor shaft 7a of the motor 7 extends in a direction perpendicular to the bottom plate portion 50c, and therefore the axis (rotation center) of the motor shaft 7a is parallel to the thickness direction of the touch panel 6. As shown in FIG. 8, the rotor 8 is fitted onto the motor shaft 7a of the motor 7, and the motor shaft 7a and the rotor 8 rotate integrally. The rotor 8 is a disk-like weight member having a weight distribution that is point-symmetrical with respect to the axis of the motor shaft 7a. A gear portion 8c having teeth at regular pitches is provided on the outer peripheral surface of the rotor 8. A cam engaging portion 8a pressed against the cam surface 20a of the left-hand wave cam portion 20 in FIG. 2 is provided at the axial end of the rotor 8 facing the wave cam portion 20. A sliding cam surface 8b of the cam engaging portion 8a can be in sliding contact with the cam surface 20a of the wave cam portion 20 over the entire circumference (see FIG. 9 and FIG. 12). The sliding cam surface 8b of the cam engaging portion 8a has the same shape as the cam surface 20a of the wave cam portion 20. The sliding cam surface 8b slides relative to the cam surface 20a of the left-hand wave cam portion 20 in FIG.

Figure 12:
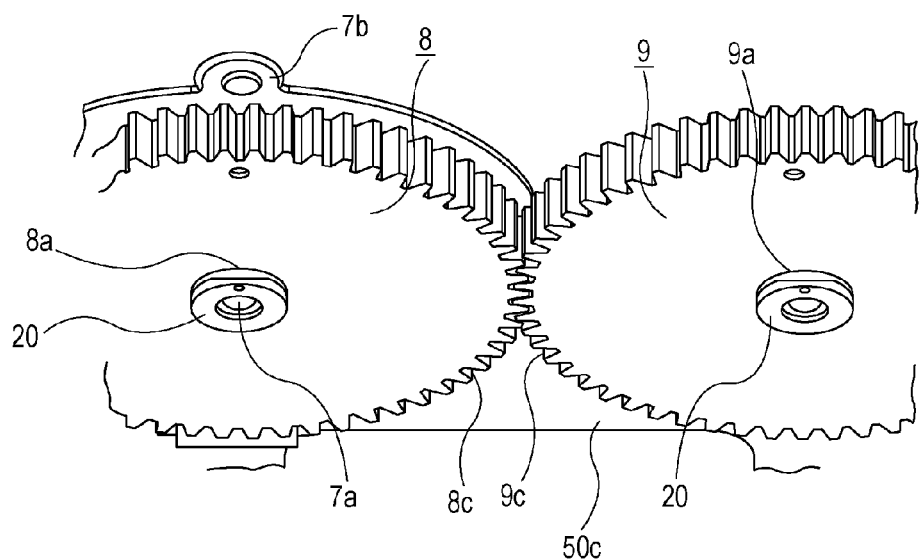
FIG. 12 is an explanatory diagram showing a state where a stationary-side cam surface and a movable-side cam surface of each cam mechanism are in contact with each other over the entire circumference.
Figure 14:
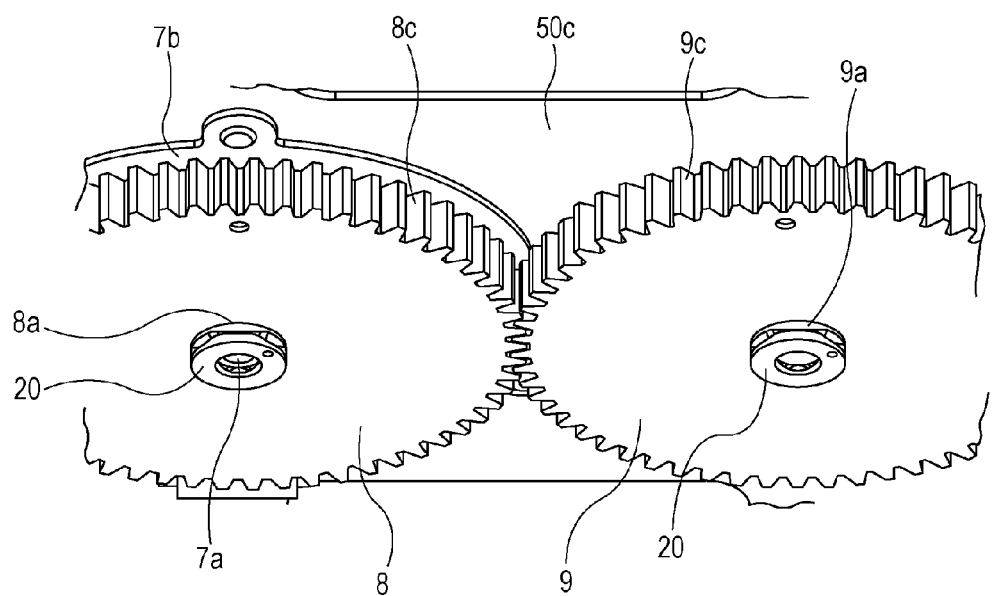
FIG. 14 is an explanatory diagram showing a state where the stationary-side cam surfaces of the cam mechanisms are pushing up the movable-side cam surfaces.

2 with the rotation of the motor shaft 7a. Therefore, the movable chassis 5 vibrates in the vertical direction in FIG. 2 above the wave cam portion 20 via the rotor 8 and the motor 7. At that time, the distance between the bottom plate portion 50c of the movable chassis 5 and the inner bottom surface of the stationary chassis 2 is minimum when the peaks of the cam engaging portion 8a (sliding cam surface 8b) are fitted in the valleys of the wave cam portion 20 (cam surface 20a) as shown in FIG. 12, and is maximum when the peaks of the sliding cam surface 8b are located on the peaks of the cam surface 20a as shown in FIG. 14.

The driven rotor 9 has a shaft portion 9d at its center, and the shaft portion 9d is inserted into the bearing portion 10. The bearing portion 10 is fixed to the attachment hole 50f in the bottom plate portion 50c of the lower bracket 50. As shown in FIG. 8, a retaining washer 11 is fitted onto the tip of the shaft portion 9d inserted into the bearing portion 10, and the driven rotor 9 is rotatably supported by the movable chassis 5. The driven rotor 9 has substantially the same shape as the rotor 8 fitted onto the motor shaft 7a of the motor 7, and the rotor 8 and the driven rotor 9 are meshed with each other (see FIG. 7). That is to say, the driven rotor 9 is also a disk-like weight member having a weight distribution that is point-symmetrical with respect to the rotation center (shaft portion 9d). A gear portion 9c having teeth at regular pitches is provided on the outer peripheral surface of the driven rotor 9. The gear portion 9c meshes with the gear portion 8c of the rotor 8. A cam engaging portion 9a pressed against the cam surface 20a of the right-hand wave cam portion 20 in FIG. 2 is provided at the axial end of the driven rotor 9 facing the wave cam portion 20. A sliding cam surface 9b of the cam engaging portion 9a can be in sliding contact with the cam surface 20a of the wave cam portion 20 over the entire circumference (see FIG. 9 and FIG. 12). The sliding cam surface 9b of the cam engaging portion 9a has the same shape as the cam surface 20a of the wave cam portion 20. When the rotor 8 is rotationally driven integrally with the motor shaft 7a, the driven rotor 9 rotates in a direction opposite to the direction of rotation of the rotor 8. The sliding cam surface 9b slides relative to the cam surface 20a of the right-hand wave cam portion 20 in FIG. 2 with the rotation of the driven rotor 9. The movable chassis 5 vibrates in the vertical direction in FIG. 2 above the wave cam portion 20 via the driven rotor 9.

The cam mechanism including the cam engaging portion 8a of the rotor 8 and the left-hand wave cam portion 20 in FIG. 2 and the cam mechanism including the cam engaging portion 9a of the driven rotor 9 and the right-hand wave cam portion 20 in FIG. 2 have the same structure and are always synchronized with each other. Therefore, when the motor shaft 7a is rotationally driven, the movable chassis 5 vibrates in the vertical direction in FIG. 2 while maintaining horizontal attitude, and the touch panel 6 vibrates in the thickness direction via the movable chassis 5. That is to say, by this pair of cam mechanisms, the rotational driving force of the motor 7 is converted into a driving force in the thrust direction (the thickness direction of the touch panel 6) and is transmitted to the movable chassis 5. This pair of cam mechanisms, the motor 7, the rotor 8, and the driven rotor 9 form a vibration imparting mechanism capable of vibrating the touch panel 6 in the thickness direction via the movable chassis 5.

In the touch screen device 1 configured as above, when the touch panel 6 detects that a fingertip or the like of the user is pressed against the input operation surface 6a, the detection signal triggers the activation of the motor 7, and the motor 7 rotates the motor shaft 7a. The rotor 8 and the driven rotor 9 start rotating in opposite directions, and the movable chassis 5 starts vibrating in the vertical direction in FIG. 2 above the wave cam portions 20 via the cam engaging portions 8a and 9a. As a result, the touch panel 6 fixed to the movable chassis 5 vibrates in the thickness direction, and therefore the user can sense that the input operation is being performed without fail.

When it is detected that a fingertip or the like of the user is pressed against a particular area of the input operation surface 6a, for example, an area in an image on the display panel 30 where selection items and the like are displayed, the touch panel 6 can be vibrated in a vibration pattern corresponding to the particular area. In this case, the user can haptically determine whether or not the present input operation is correct from the vibration pattern transmitted to a fingertip or the like, and therefore this makes it easy to prevent erroneous operation.

As described above, in the touch screen device 1 according to this embodiment, the cam engaging portions 8a and 9a slide relative to the cam surfaces 20a of the wave cam portions 20 with the rotation of the motor shaft 7a of the motor 7, therefore the rotational driving force of the motor 7 is converted into a driving force in the thrust direction, and the touch panel 6 can be vibrated in the thickness direction via the movable chassis 5. At that time, a vibration pattern or vibration acceleration corresponding to the shape of the cam surfaces 20a and the sliding cam surfaces 8b and 9b can be imparted to the touch panel 6. After the cam mechanisms push up the touch panel 6 in the thickness direction, the leaf springs 4 elastically urge the touch panel 6 toward the original position. Therefore, it is easy to vibrate the touch panel 6 in the thickness direction with a high acceleration smoothly. In addition, since an inexpensive thin brushless motor can be used, an increase in cost and thickness of the whole device can be easily avoided.

In the touch screen device 1 according to this embodiment, the rotor 8 is fixed to the motor shaft 7a of the motor 7, and the rotor 8 has a weight distribution that is point-symmetrical with respect to the axis of the motor shaft 7a. Therefore, vibration with a high acceleration can be easily imparted to the touch panel 6 utilizing the inertial force of the rotor 8 rotationally driven by the motor 7. In addition, in this embodiment, the driven rotor 9 having a weight distribution that is point-symmetrical with respect to the rotation center is rotatably supported by the movable chassis 5, and the driven rotor 9 meshes with the periphery (gear portion 8c) of the rotor 8 and rotates in synchronization with the rotor 8 in a direction opposite to the direction of rotation of the rotor 8. The cam engaging portions 8a and 9a provided at the axial ends of the rotor 8 and the driven rotor 9 are slidably pressed against the cam surfaces 20a of the pair of wave cam portions 20 provided in the stationary chassis 2. Thus, the cam mechanisms that convert the rotational driving force of the motor 7 into a driving force in the thrust direction are disposed in a well-balanced manner at two places. Therefore, the movable chassis 5 can be easily vibrated in the thickness direction of the touch panel 6 with a high acceleration utilizing the inertial force of the rotor 8 and the driven rotor 9. Even when the touch panel 6 is relatively large, required vibration acceleration can be easily transmitted to a fingertip or the like of the user.

The cam engaging portions 8a and 9a each forming a cam mechanism are integrally provided at the axial ends of the rotor 8 and the driven rotor 9, and the wave cam portions 20 are integrally provided on the inner bottom surface of the stationary chassis 2. Therefore, this device is safe from an increase in the number of parts or a decrease in ease of assembly due to addition of cam mechanisms.

Since the driven rotor 9 is added to the rotor 8 as described above, when the rotor 8 is rotationally driven by the motor 7, the driven rotor 9 rotates in the opposite direction in synchronization. Therefore, if unwanted force (vibration) that drives the touch panel 6 in the in-plane direction is generated by the rotation of the rotor 8, this unwanted force can be cancelled out with the rotation of the driven rotor 9. Therefore, the vibration in the thickness direction of the touch panel 6, which is easily recognized by the sense of touch of the user, can be emphasized, and feedback using the vibration of the touch panel 6 can be effectively performed.

However, when the touch panel 6 is not very large, the driven rotor 9 may be omitted. When the touch panel 6 is very large, two or more driven rotors may be meshed with the periphery (gear portion 8c) of the rotor 8.

In the touch screen device 1 according to this embodiment, the motor 7 provided with the rotor 8 is attached to the movable chassis 5, and therefore it is easy to stably vibrate the touch panel 6 in the thickness direction with the rotational driving force of the motor 7. It is also possible to attach the motor 7 provided with the rotor 8 to the stationary chassis 2 and to press the cam engaging portion 8a provided in the rotor 8 against the wave cam portion 20 provided in the movable chassis 5.

In the touch screen device 1 according to this embodiment, the cam engaging portion 8a (9a) of each cam mechanism has the sliding cam surface 8b (9b) having the same shape as the cam surfaces 20a of the wave cam portions 20, and the sliding cam surface 8b (9b) can be in sliding contact with the corresponding one of the cam surfaces 20a of the wave cam portions 20 over the entire circumference. That is to say, the cam surface of the cam engaging portion 8a (9a) and the cam surface of the corresponding one of the wave cam portions 20 are almost in contact with each other over the entire circumference when the peaks of one of them are fitted in the valleys of the other, and the cam engaging portion 8a (9a) is pushed up in the thickness direction of the touch panel 6 when the peaks of one of them are located on the peaks of the other. For this reason, this cam mechanism can vibrate the touch panel 6 smoothly in the thickness direction with the rotation of the motor shaft 7a, and is reliable despite its simple structure.

In the touch screen device 1 according to this embodiment, the LCD unit 3 including the display panel 30 is fixed to the stationary chassis 2, and the display panel 30 does not vibrate and is maintained in a fixed state when the touch panel 6 is vibrated by the driving force of the motor 7. For this reason, the LCD unit 3 is not included in the total weight of the vibrating body, and the touch panel 6 is easily vibrated owing to reduction in weight of the vibrating body. In addition, the display panel 30 that is a liquid crystal display is safe from image disruption caused by vibration.

However, when the amplitude of vibration imparted to the touch panel 6 is not very large, both the touch panel 6 and the LCD unit 3 may be held by the movable chassis 5, and the LCD unit 3 may be vibrated in the thickness direction together with the touch panel 6 by the driving force of the motor 7. For example, in a touch screen device in which a film-like touch panel is bonded to the surface of a display panel such as an LCD, the touch panel and the display panel need to be vibrated together.

In the touch screen device 1 according to this embodiment, the plurality of leaf springs 4 attached to the stationary chassis 2 and supporting the movable chassis 5 elastically urge the touch panel 6 pushed up by the cam mechanisms toward the original position, and when the touch panel 6 is not vibrating, the movable chassis 5 is held in a well-balanced manner in a predetermined position within the stationary chassis 2 by the leaf springs 4. Thus, the leaf springs 4 supporting the movable chassis 5 are used as elastically urging portions necessary to smoothly vibrate the touch panel 6, and therefore the structure of the whole device is prevented from being complicated and the component cost can be reduced. In this embodiment, a rectangular frame-like cushion member 15 is interposed between the front frame portion 22 of the stationary chassis 2 and the upper bracket 51 of the movable chassis 5, and the cushion member 15 performs the same function as the leaf springs 4. That is to say, the cushion member 15 also elastically urges the touch panel 6 pushed up by the cam mechanisms to the original position, and contributes to holding the movable chassis 5 in a predetermined position.

The cam engaging portion 8a (9a) of each cam mechanism only has to be in sliding contact with the corresponding one of the cam surfaces 20a of the wave cam portions 20 and to rotate relative thereto, and does not necessarily have to have a sliding cam surface 8b (9b). For example, a protrusion-like cam engaging portion in sliding contact with the cam surface 20a can be substitute for the cam engaging portion 8a (9a). A wave cam portion may be provided at the axial end of the rotor 8 or the driven rotor 9, and the wave cam portion may be rotated by the driving force of a motor. Instead of the movable chassis, a motor may be attached to the stationary chassis.

Although preferred embodiments have been described in detail, the present invention is not limited to these specific embodiments. Rather, various modifications and changes can be made without departing from the scope of the present invention as described in the accompanying claims. Accordingly, all such modifications are intended to be included within the scope of this invention as defined in the following claims.

What is claimed is:

1. A touch screen device comprising:
   a display panel;
   a touch panel disposed in front of the display panel;
   a movable chassis configured to retain the touch panel;
   a stationary chassis configured to support the moveable chassis;
   a vibration imparting mechanism configured to vibrate the movable chassis to impart vibration to the touch panel;
   the vibration imparting mechanism further including:
     a motor having a motor shaft, the motor attached to the movable chassis or the stationary chassis;
     an axis of the motor shaft extending in a thickness direction of the touch panel;
     a cam mechanism configured to convert a rotational driving force of the motor into a driving force in the thickness direction of the touch panel, wherein the driving force is transmitted to the movable chassis; and
     an elastically urging portion configured to permit the movable chassis to be reciprocally moved by the cam mechanism, and
   the cam mechanism further including:
     a wave cam portion having a cam surface;
     the cam surface having a plurality of wave-like recesses and protrusions arranged along a circumference of the wave cam portion, the wave-like recesses and protrusions arranged radially relative to the axis of the motor; and
     a cam engaging portion configured to slidingly contact the cam surface and is rotatable relative to the wave cam portion, wherein one of the wave cam portion and the cam engaging portion is coupled to the motor shaft, and the other is coupled to the movable chassis or the stationary chassis.

2. The touch screen device according to claim 1, wherein the vibration imparting mechanism has a rotor having a weight distribution that is point-symmetrical with respect to the axis of the motor shaft, and wherein the rotor is fixed to the motor shaft.

3. The touch screen device according to claim 1, wherein the cam engaging portion has a sliding cam surface having a similar shape as the cam surface of the wave cam portion, and the sliding cam surface is configured to slidingly contact the cam surface over the entire circumference.

4. The touch screen device according to claim 2, wherein the cam engaging portion or the wave cam portion is provided at an axial end of the rotor.

5. The touch screen device according to claim 2, wherein the motor is attached to the movable chassis.

6. The touch screen device according to claim 2, wherein the vibration imparting mechanism has a driven rotor rotatably supported by the movable chassis or the stationary chassis, the driven rotor having a weight distribution that is point-symmetrical with respect to its axis of rotation; and
wherein gear portions provided on the peripheries of the rotor and the driven rotor are meshed with each other, one of an axial end of the driven rotor and a member in sliding contact with the axial end is provided with a wave cam portion, and the other is provided with a cam engaging portion.

7. The touch screen device according to claim 2, wherein the elastically urging portion includes a plurality of leaf springs attached to the stationary chassis and supporting the movable chassis.

8. The touch screen device according to claim 2, wherein the display panel is fixed to the stationary chassis.

9. A touch screen device comprising:
a display panel;
a touch panel disposed in front of the display panel;
a movable chassis configured to retain the touch panel;
a stationary chassis configured to support the moveable chassis;
a vibration imparting mechanism configured to vibrate the movable chassis to impart vibration to the touch panel;
the vibration imparting mechanism further including:
a motor having a motor shaft, the motor attached to the movable chassis or the stationary chassis;
an axis of the motor shaft extending in a thickness direction of the touch panel;
a cam mechanism configured to convert a rotational driving force of the motor into a driving force in the thickness direction of the touch panel, wherein the driving force is transmitted to the movable chassis; and
an elastically urging portion configured to permit the movable chassis to be reciprocally moved by the cam mechanism.

10. The touch screen device according to claim 9, comprising:
the cam mechanism further including:
a wave cam portion having a cam surface;
the cam surface having a plurality of wave-like recesses and protrusions arranged along a circumference of the wave cam portion, the wave-like recesses and protrusions arranged radially relative to the axis of the motor; and
a cam engaging portion configured to slidingly contact the cam surface and is rotatable relative to the wave cam portion, wherein one of the wave cam portion and the cam engaging portion is coupled to the motor shaft, and the other is coupled to the movable chassis or the stationary chassis.

11. The touch screen device according to claim 9, wherein the vibration imparting mechanism has a rotor having a weight distribution that is point-symmetrical with respect to the axis of the motor shaft, and wherein the rotor is fixed to the motor shaft.

12. The touch screen device according to claim 10, wherein the cam engaging portion has a sliding cam surface having a similar shape as the cam surface of the wave cam portion, and the sliding cam surface is configured to slidingly contact the cam surface over the entire circumference.

13. The touch screen device according to claim 10, wherein the cam engaging portion or the wave cam portion is provided at an axial end of the rotor.

14. The touch screen device according to claim 9, wherein the motor is attached to the movable chassis.

15. The touch screen device according to claim 10, wherein the vibration imparting mechanism has a driven rotor rotatably supported by the movable chassis or the stationary chassis, the driven rotor having a weight distribution that is point-symmetrical with respect to its axis of rotation; and
wherein gear portions provided on the peripheries of the rotor and the driven rotor are meshed with each other, one of an axial end of the driven rotor and a member in sliding contact with the axial end is provided with a wave cam portion, and the other is provided with a cam engaging portion.

16. The touch screen device according to claim 9, wherein the elastically urging portion includes a plurality of leaf springs attached to the stationary chassis and supporting the movable chassis.

17. The touch screen device according to claim 9, wherein the display panel is fixed to the stationary chassis.

* * * * *